United States Patent [19]

Kloster

[11] Patent Number: 4,558,500
[45] Date of Patent: Dec. 17, 1985

[54] SPRING COMPRESSOR FOR MACPHERSON STRUT SUSPENSION ASSEMBLIES

[75] Inventor: Kenneth D. Kloster, Maumee, Ohio

[73] Assignee: Kloster Research & Development, Inc., Toledo, Ohio

[21] Appl. No.: 475,905

[22] Filed: Mar. 16, 1983

[51] Int. Cl.[4] ............................................. B23P 19/04
[52] U.S. Cl. ...................................... 29/227; 254/10.5
[58] Field of Search .................. 29/227, 225; 254/10.5

[56] References Cited

U.S. PATENT DOCUMENTS

| | | | |
|---|---|---|---|
| 3,087,706 | 4/1963 | Van Der Witt | 254/10.5 |
| 4,009,867 | 3/1977 | Diffenderfer | 254/10.5 |
| 4,140,305 | 2/1979 | Rabin | 269/900 |
| 4,191,366 | 3/1980 | Rabin | 269/900 |

*Primary Examiner*—James L. Jones, Jr.
*Attorney, Agent, or Firm*—Fraser & Clemens

[57] ABSTRACT

The present invention relates to a spring compressor adapted to compress an associated coil spring of a MacPherson strut suspension system. The spring compressor includes a lower clamping member adapted to be secured to the portion of the cylindrical shroud of the MacPherson strut located below the associated helical spring platform. A pair of spaced apart elongate threaded shank members are mounted on the clamping member and extend upwardly where they are threadably connected to a pair of spaced apart upper spring engaging hooks. In accordance with the principles of the present invention, the elongated shank members are adjustably mounted to the clamping member to permit adjustment of the spaced apart distance between the upper spring engaging hooks. This enables the spring compressor to accommodate coil springs of various diameters. Also, the longitudinal axis of the threaded shank members can be adjusted to move the upper spring engaging hooks toward and away from the clamping member along an axis which is non-parallel with the longitudinal axis of the cylindrical shroud to which the clamping member is attached.

20 Claims, 8 Drawing Figures

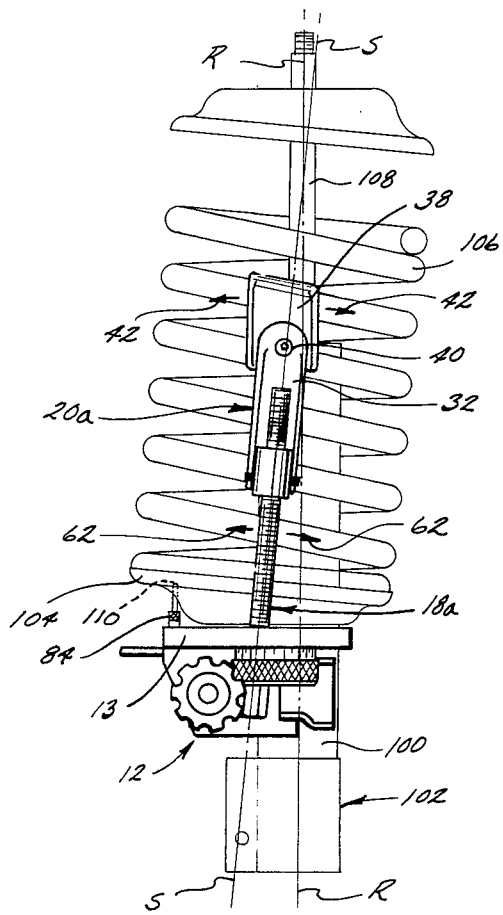
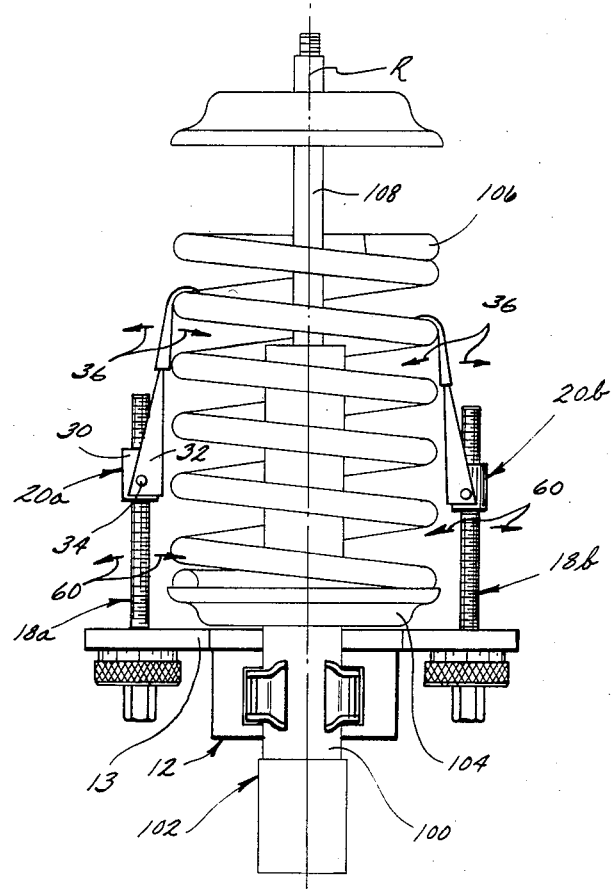
FIG. 2        FIG. 3
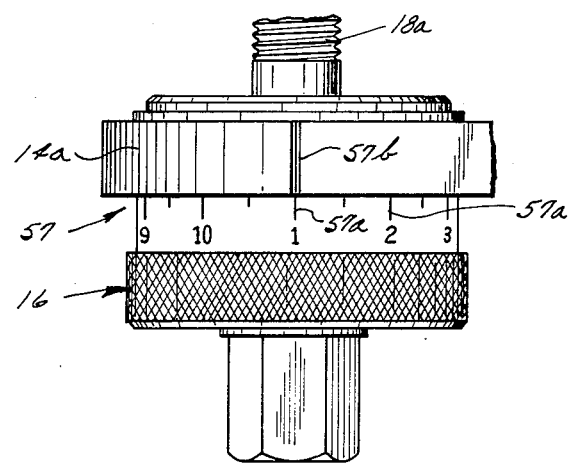
FIG. 4

SPRING COMPRESSOR FOR MACPHERSON STRUT SUSPENSION ASSEMBLIES

BACKGROUND OF THE INVENTION

One type of vehicle suspension system which is becoming increasingly popular is the MacPherson strut suspension system. The MacPherson strut is an integral coil spring-shock absorber assembly which provides a lightweight, compact component of a vehicle suspension system. The MacPherson strut suspension system is disclosed in more detail in U.S. Pat. No. 2,624,592 to E. S. MacPherson.

One of the problems associated with MacPherson strut assemblies is related to the replacement of a worn shock absorber unit. One solution to this problem is to manufacture the MacPherson strut assembly with a construction which permits the shock absorber to be readily removed and replaced with a new shock absorber. However, such a repair procedure can be relatively time consuming, since typically the entire strut assembly must be removed from the vehicle.

One solution to reducing the time associated with repairing a MacPherson strut assembly is disclosed in U.S. Pat. No. 4,034,960 to K. D. Kloster. The Kloster patent discloses a pneumatically operated spring compressor which can be utilized to repair a strut assembly while the lower portion of the assembly remains attached to the vehicle. However, the economics of such a compressor can typically only be justified by repair shops which frequently repair strut suspension systems.

Smaller repair shops typically utilize a mechanically-actuated spring compressors of the type manufactured by Warren, Inc. of Jonesborough, Ark. This type of spring compressor includes a pair of spaced apart U-shaped hooks which are maintained in a facing relationship by means of an elongate bolt. In operation, typically two or three of the compressor units are circumferentially spaced about the coil springs and the bolts are alternately tightened to move the U-shape hooks toward one another, thereby compressing the spring.

Another type of mechanically actuated spring compressor is disclosed in U.S. Pat. No. 4,219,918 to Klann. The Klann patent discloses a spring compressor having a hollow guide tube and a threaded spindle rotatably mounted in the guide tube. A first spring engaging shoe is secured to one end of the guide tube, while a second spring engaging shoe is mounted on a sleeve which is slidable along the guide tube. The sleeve threadably engages the spindle such that rotation of the spindle causes movement of the second spring shoe along the guide tube.

SUMMARY OF THE INVENTION

The present invention relates to a spring compressor adapted to compress an associated coil spring of a MacPherson strut suspension system. The spring compressor includes a lower clamping member adapted to be secured to the portion of the cylindrical shroud of the MacPherson strut located below the lower coil spring platform. A pair of spaced apart elongate threaded shank members are mounted on the clamping member. The shank members extend upwardly and have upper ends threadably connected to a pair of spaced apart upper spring engaging hooks.

In accordance with the principles of the present invention, the elongate shank members are adjustably mounted to the clamping member to permit adjustment of the spaced apart distance between the upper spring engaging hooks. This enables the spring compressor to accommodate coil springs of various diameters. Also, the longitudinal axis of the threaded shank members can be adjusted to move the upper spring engaging hooks toward and away from the clamping member along a axis which is non-parallel with the longitudinal axis of the cylindrical shroud to which the clamping member is attached. This enables the spring compressor to effectively compress coil springs having an axis which is non-parallel with the longitudinal axis of the associated cylindrical shroud.

BRIEF DESCRIPTION OF THE DRAWINGS

The above, as well as other features and advantages of the invention, will become readily apparent to one skilled in the art from reading the following detailed description of the invention when considered in light of the accompanying drawings, in which:

FIG. 2 is a side elevational view of the spring compressor of FIG. 1 positioned on a MacPherson strut suspension unit;

FIG. 3 is a front elevational view of the spring compressor and the MacPherson strut suspension unit of FIG. 2;

FIG. 4 is a front elevational of one of the adjusting cams of the spring compressor of FIG. 1;

DESCRIPTION OF THE PREFERRED EMBODIMENT

Figure 1:
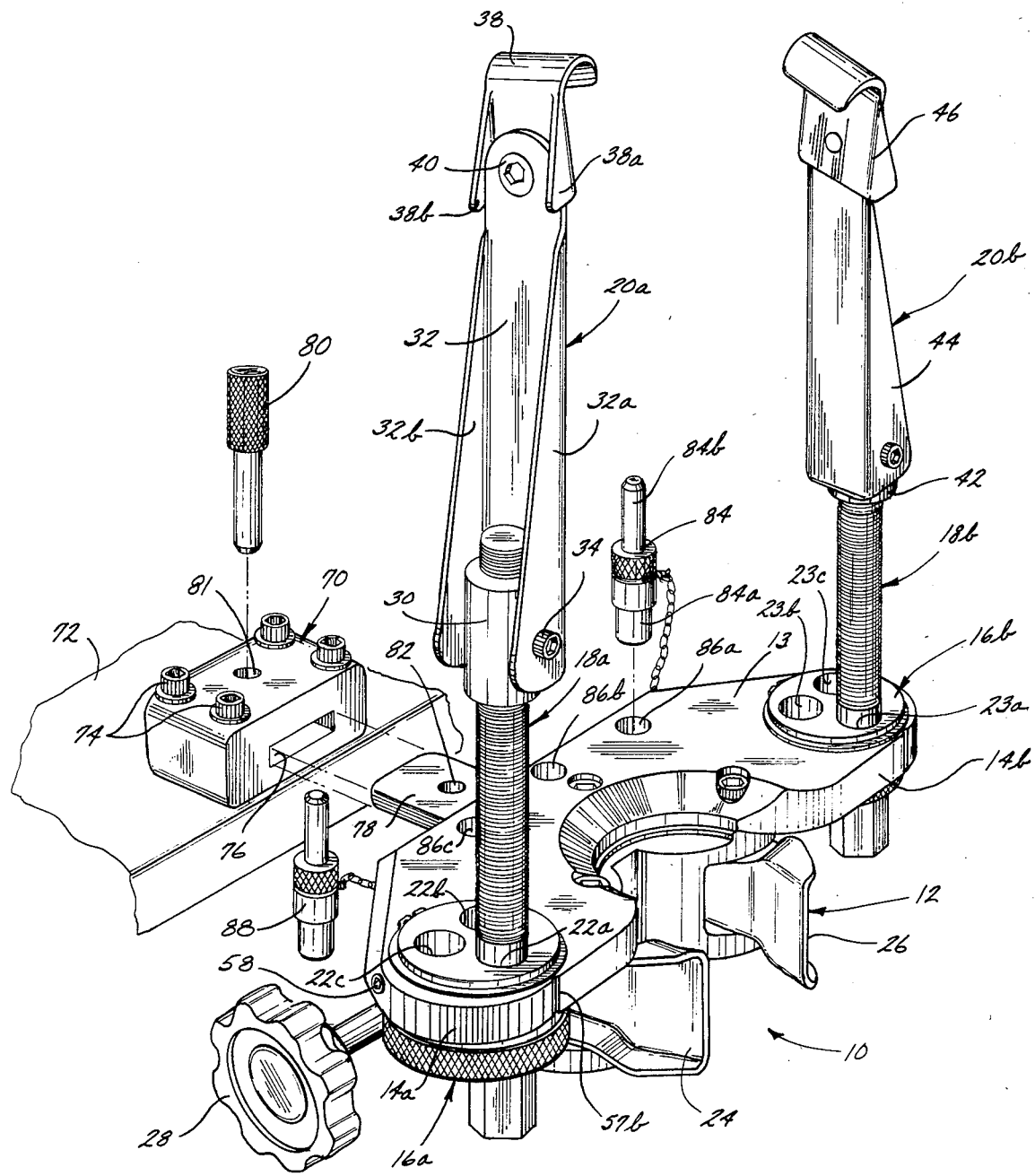
FIG. 1 is a perspective view of a spring compressor embodying the features of the present invention.

Referring to FIG. 1, there is shown a spring compressor 10 incorporating the features of the present invention. The spring compressor 10 includes a lower clamping member 12 which, as will be discussed, is adapted to be secured to the portion of a cylindrical shroud 100 (shown in FIGS. 2 and 3) of a MacPherson strut suspension assembly 102 located below a lower coil spring support platform 104. The support platform 104 provides a lower seat for an associated coil spring 106 which is positioned about a shock absorber unit 108. The clamping member 12 includes a main body portion 13 having a pair of outwardly extending ear portions 14a and 14b which are used to mount a pair of rotatable adjusting cams 16a and 16b. A pair of elongate threaded shanks 18a and 18b extend through the adjusting cams 16a and 16b and have their upper ends threadably secured to a pair of spaced apart upper spring engaging hook assemblies 20a and 20b. As will be discussed, the adjusting cam 16a is provided with three apertures 22a, 22b and 22c, one of which is selected to receive the elongated threaded shank 18a. Each of the apertures 22a, 22b and 22c may have a central axis which is offset a predetermined angular amount from the rotating axis of the adjusting cam 16a. This provides a means for adjusting the position of the longitudinal axis of the associated threaded shank, thereby adjusting the position of the upper spring engaging hook assembly relative to the clamping axis of the clamping member 12. As shown in FIGS. 2 and 3, the clamping axis is coaxial with the longitudinal axis R of the associated cylindrical shroud. The cam 16b includes apertures 23a, 23b, and 23c which are similar to the apertures 22a, 22b, and 22c respectively of the cam 16a.

Basically, the portion of the clamping member 12 which is utilized to clamp to the cylindrical shroud 100 is similar in operation to the adapter shown in FIGS. 15 through 17 of U.S. Pat. No. 4,034,960 to K. D. Kloster, which is herein incorporated by reference. The clamping member 12 includes a pair of clamping levers 24 and 26 which are pivotally mounted relative to the main body 13 of the clamping member 12. An acutating knob 28 is coupled to operate the clamping levers 24 and 26. When the knob 28 is rotated in one direction, the clamping levers 24 and 26 will be pivoted toward one another and, when the knob 28 is rotated in the opposite direction, the clamping levers 24 and 26 will be pivoted away from one another. When a MacPherson strut shroud is placed between the clamping members and the knob is rotated to move the clamping members toward one another, the shroud will be urged against the main body 13 of the clamping member 12 and thereby securely held.

Before discussing the operation of the adjusting cams 16a and 16b, the upper spring engaging hook assemblies 20a and 20b will be described. The upper spring engaging hook assembly 10a includes an internally threaded sleeve 30 which is adapted to receive the threaded portion of the shank 18a. An elongate channel member 32 includes a pair of spaced apart flanges 32a and 32b having their lower ends secured to the sleeve 30 by means of a pair of diametrically opposed threaded fasteners 34. As shown in FIG. 3, the channel member 32 is adapted to pivot about the fasteners 34 relative to the sleeve 30, as represented by direction arrows 36. A spring engaging hook 38 is pivotally mounted on the upper end of the channel member 32 by means of a suitable fastener 40. As shown in FIG. 2, the spring engaging hook 38 is adapted to pivot about the fastener 40 relative to the channel member 32, as represented by direction arrows 42. The spring engaging hook 38 is provided with a pair of spaced apart flange members 38a and 38b which are adapted to engage the side marginal edges of the channel member 32 and limit the pivotal movement of the hook.

The spring engaging hook assembly 20b is similar in construction to the hook assembly 20a. The hook assembly 20b includes an internally threaded sleeve 42, an elongate channel member 44, and an upper spring engaging hook 46, all of which cooperate to function in a manner similar to the components of the hook assembly 20a.

As previously mentioned, the adjusting cams 16a and 16b are utilized to adjust the position of the threaded shanks 18a and 18b respectively relative the longitudinal axis (represented by reference line R in FIGS. 2 and 3) of the cylindrical shroud 100 to which the clamping member 12 is secured. Referring to FIGS. 4, 5, and 6a through 6c, the adjusting cam 16a includes a lower knurled portion 50 and an upper reduced diameter portion 52 which is inserted into an aperture 53 formed in the ear portion 14a. An annular groove 54 formed adjacent the upper end of the cam 16a is adapted to receive a snap ring 56 for rotatably supporting cam 16a on the ear portion 14a.

As shown in FIG. 4, a position indicating system 57 is located about the cam 16a immediately above the knurled portion 50. The position indicating system 57 includes a plurality of individual numerical markings 57a which cooperate with a reference mark 57b formed on the ear portion 14a of the main body 13 for positioning the cam 16a in a selected rotative position relative to the main body 13. After the rotational position of the cam 16a has been adjusted in a manner as will be discussed, a set screw 58 (shown in FIG. 5) threadably mounted in the ear portion 14a is utilized to securely engage the cam 16a and prevent rotational movement thereof. The cam 16b is similar in construction to the cam 16a except that the individual numerical markings (not shown) on the cam 16b increase in one direction around the cam 16b, while the numerical markings 57a on the cam 16a increase in an opposite direction around the cam 16a. Thus, when the two cams 16a and 16b are positioned at the identical numerical setting, the apertures in the cam 16a corresponding to the apertures in the cam 16b will be equally spaced from the clamping axis of the tool.

Figure 5:
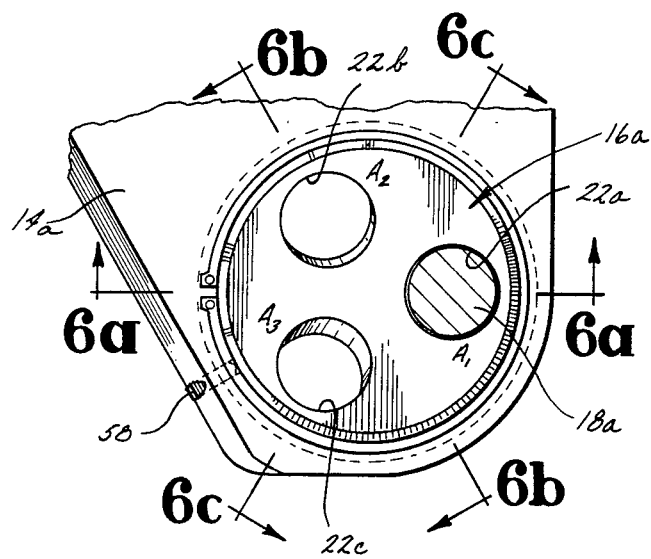
FIG. 5 is a top plan view of the adjusting cam of FIG. 4.
Figure 6A:
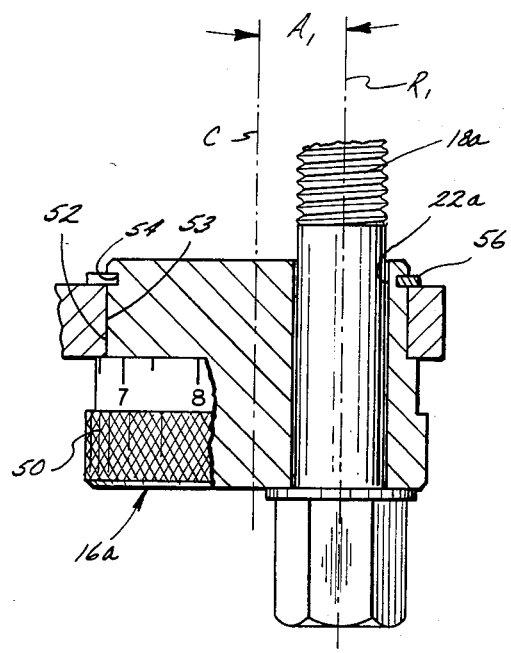
FIG. 6a is a sectional view taken along the line 6a—6a of FIG. 5.
Figure 6B:
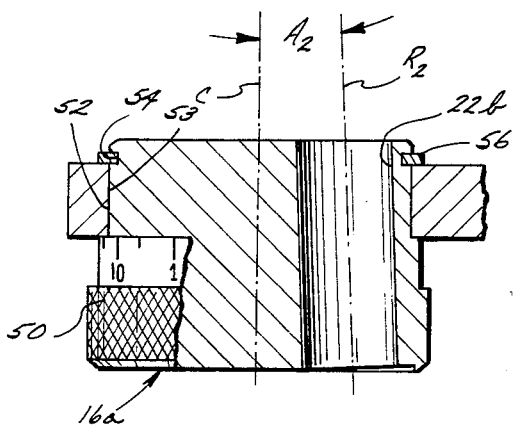
FIG. 6b is a sectional view taken along the line 6b—6b of FIG. 5.
Figure 6C:
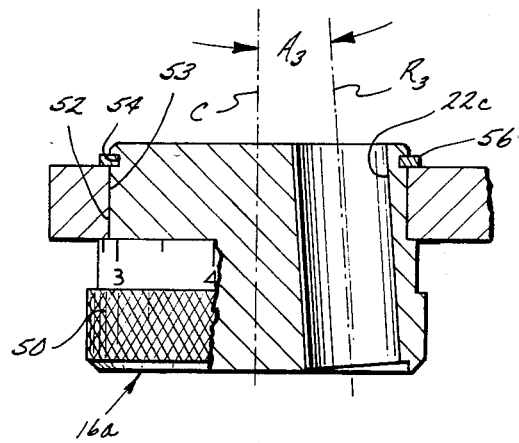
FIG. 6c is a sectional view taken along the line 6c—6c of FIG. 5.

As shown in FIGS. 6a through 6c, the apertures 22a, 22b, and 22c are formed through the cam 16a along axes having a predetermined angular position relative to the central, rotational axis C of the cam 16a. Generally, the axis C of the cam 16a will be substantially parallel to the longitudinal axis R of the cylindrical shroud. In FIG. 6a, the aperture 22a is formed along an axis $R_1$, which forms an angle $A_1$ with respect to the cam axis C. In FIG. 6b, the aperture 22b is formed along an axis $R_2$, which forms an angle $A_2$ with respect to the cam axis C. Similarly, the aperture 22c in FIG. 6c is formed along an axis $R_3$, which forms an angle $A_3$ with respect to the cam axis C. As shown in FIG. 5, the angles $A_1$, $A_2$, and $A_3$ can be marked on the upper face of the cam 16a adjacent the respective aperture. While it will be appreciated that each of the apertures 22a, 22b, and 22c can be formed at any selected angle, the angles $A_1$, $A_2$, and $A_3$ are shown in the drawings at approximately 0°, 2°, and 4° respectively.

By inserting the threaded shank 18a into a selected one of the apertures 22a, 22b, or 22c, and then rotating the cam 16a by grasping the knurled portion 50, an operator is able to adjust the position of the upper spring engaging hook assembly 20a relative to the cylindrical shroud axis R. For example, the spring hook assembly 20a can be moved toward or away from the shroud axis R, as represented by direction arrows 60 in FIG. 3, to enable the compressor 10 to accommodate helical coil springs of different diameters. Also, in the event the compression axis of the spring (represented by reference line S in FIG. 2) is offset by a predetermined angular amount from the shroud axis R, the longitudinal axis of the threaded shank 18a can be adjusted as represented by direction arrows 62 such that the longitudinal axis of the threaded shank 18a is generally parallel to the spring axis S to cause the spring engaging hook 20a to be moved toward the clamping member 12 along an axis parallel to the spring axis S. The opposite adjusting cam 16b can be utilized to adjust the associated spring engaging hook assembly and the threaded shank in a similar manner. Thus, the adjustment mechanism of the present invention enables the spring compressor to be utilized with MacPherson strut assemblies having different diameter springs, and also with springs having an axis which is offset a predetermined angular amount from the shroud axis R.

The indicating system 57 along with the individual angle markings of the apertures on the cams enable the tool to be quickly set to a predetermined setting for compressing a spring on a certain type of MacPherson strut assembly. Thus, once a reference chart has been compiled to provide a list of predetermined settings corresponding to certain vehicles, an operator need only refer to such reference chart to determine the cam setting required to compress a MacPherson strut spring on a particular make of vehicle.

An additional feature of the present invention is illustrated in FIG. 1 and includes a mounting block 70 which is adapted to be securely bolted to a work bench 72 by a plurality of bolts 74. The mounting block 70 is provided with a slot 76 which is adapted to receive a tab portion 78 extending rearwardly from the main body of the clamping member 12. Once the tab 78 has been inserted into the slot 76, a holding pin 80 can be inserted through an aperture 81 formed in the block 70 and an aperture 82 formed in the tab 78. Such an arrangement enables the spring compressor to be utilized to support the MacPherson strut assembly at a remote location.

A further feature of the present invention includes the use of at least one locating pin 84 which can be utilized to properly position the spring compressor on the cylindrical shroud portion of certain types of MacPherson strut assemblies. For example, certain MacPherson strut assemblies are provided with locating holes (such as hole 110 in FIG. 2) in the lower spring platform 104. The locating pin 84 has a lower cylindrical portion 84a which is adapted to be inserted in a selected one of three apertures 86a, 86b, and 86c formed in the top of the clamping member 12 and an upper end 84b which is adapted to be inserted in the locating hole 110 formed in the spring platform 104. In certain MacPherson strut assemblies, two such locating holes are provided in the lower spring platform. In these instances, a second locating pin 88, similar in construction to the locating pin 84, can be utilized to assist the operator in properly positioning the clamping member 12.

In accordance with the provisions of the patent statutes, the principal and mode of operation of the invention have been explained and what is considered to represent its best embodiment. It should, however, be understood that the invention may be practiced otherwise and as specifically illustrated and described without departing from its spirit or scope.

What is claimed is:

1. A tool for compressing a helical coil spring of a coil spring/shock absorber suspension assembly wherein the coil spring is positioned about the shock absorber and has one end supported on a spring platform attached to the shock absorber, said tool comprising:

lower clamp means adapted to be secured relative to the shock absorber and having a clamping axis coaxial with the longitudinal axis of the shock absorber;

upper spring engaging means adapted to securely engage a portion of the coil spring;

means for moving said upper spring engaging means toward and away from said clamp means, said means for moving including an elongate threaded shank having one end supported for rotational movement about its longitudinal axis by said clamp means and an opposite end adapted to be threadedly connected to said upper spring engaging means whereby rotation of said shank in one direction causes said spring engaging means to move toward said clamp means and rotation of said shank in and opposite direction causes said spring engaging means to move away from said clamp means, said upper spring engaging means having at least one hook assembly including a hook member having a downwardly facing groove for receiving a portion of the helical coil of the spring and sleeve means for threadedly connecting said hook member to said threaded shank; and means for adjustably mounting said upper spring engaging means on said clamp means to enable the position of said upper spring engaging means to be adjusted relative to the clamping axis of said clamp means.

2. A tool according to claim 1 wherein said means for moving is adapted to move said upper spring engaging means along a first axis spaced from the clamping axis of said clamp means and said adjustable mounting means includes means for adjusting the spaced apart distance between said first axis and the clamping axis of said clamp means.

3. A tool according to claim 2 wherein said adjustable mounting means includes means for adjusting the angular position between said first axis and the clamping axis of said clamp means.

4. A tool according to claim 1 wherein said hook assembly includes means for pivotally connecting said hook member to said sleeve means.

5. A tool according to claim 1 wherein said hook assembly includes a channel member for connecting said hook member to said sleeve means.

6. A tool according to claim 5 including means for pivotally connecting one end of said channel member to said sleeve means.

7. A tool according to claim 6 including means for pivotally connecting the other end of said channel member to said hook member.

8. A tool according to claim 1 wherein said means for adjustably mounting said upper spring engaging means includes means for adjusting the spaced apart distance between the longitudinal axis of said shank and the clamping axis of said clamp means.

9. A tool according to claim 8 wherein said adjustable mounting means includes means for adjusting the angular position between the longitudinal axis of said shank and the clamping axis of said clamp means.

10. A tool according to claim 9 wherein said adjustable mounting means includes a rotatable cam member mounted on said clamp means, said cam member having an aperture formed therethrough with an axis spaced from the rotational axis of said cam member, said aperture adapted to receive the lower end of said shank, whereby rotation of said cam member causes the longitudinal axis of said shank to be adjusted relative to the clamping axis of said clamp means.

11. A tool according to claim 10 wherein the axis of said aperture is formed therethrough at a predetermined angle relative to the rotational axis of said cam member.

12. A tool according to claim 11 wherein said cam member has a plurality of apertures formed therethrough, each aperture having an axis which forms a different angle with the rotational axis of said cam member.

13. A tool according to claim 10 wherein said adjustable mounting means includes means for releasably securing said cam member to resist rotational of said cam member relative to said clamp means.

14. A tool for compressing a helical coil spring of a coil spring/shock absorber suspension assembly wherein the coil spring is positioned about the shock absorber and has one end supported on a spring platform attached to the shock absorber, said tool comprising:

- lower clamp means adapted to be secured relative to the shock absorber and having a clamping axis coaxial with the longitudinal axis of the shock absorber;
- upper spring engaging means adapted to securely engage a portion of the coil spring;
- means for moving said upper spring engaging means toward and away from said clamp means along a predetermined compression axis; and
- means for adjustably mounting said means for moving relative to said clamp means to enable the compression axis along which said spring engaging means is moved to be set in a selected one of a plurality of positions, at least one of said positions of said compression axis being non-parallel and angularly disposed relative to said clamping axis.

15. A tool according to claim 14 including means for indicating the position of said upper spring engaging means relative to said lower clamp means.

16. A tool according to claim 14 including a support means adapted to be mounted on a fixed support and wherein said lower clamp means includes means for mounting said clamp means on said support means.

17. A tool according to claim 14 wherein said lower clamp means includes locating means adapted to be coupled between said clamp means and the spring platform for positioning said clamp means on the shock absorber.

18. A tool according to claim 14 where said means for moving includes an elongate threaded shank having one end supported for rotational movement about its longitudinal axis by said clamp means and an opposite end adapted to be threadedly connected to said upper spring engaging means whereby rotation of said shank in one direction causes said spring engaging means to move toward said clamp means and rotation of said shank in an opposite direction causes said spring engaging means to move away from said clamp means.

19. A tool according to claim 18 wherein said means for adjustably mounting said means for moving includes means for rotatably supporting said elongate threaded shank relative to said clamp means and means for adjusting the angular position of said longitudinal axis of said elongate threaded shank relative to the clamping axis of said clamp means, whereby said compression axis can be set in a selected one of a plurality of positions.

20. A tool according to claim 14 wherein said means for adjustably mounting said means for moving relative to said clamp means includes means for adjusting the spaced apart distance between the longitudinal axis of said shank and the clamping axis of said clamp means.

* * * * *